United States Patent [19]
Barker et al.

[11] Patent Number: 5,347,139
[45] Date of Patent: Sep. 13, 1994

[54] DUAL ENERGY TRACER QUANTITATIVE ANALYSIS

[75] Inventors: David L. Barker, Foster City; Richard F. Johnston, Murphys; Siobhan C. Pickett, Palo Alto, all of Calif.

[73] Assignee: Molecular Dynamics, Sunnyvale, Calif.

[21] Appl. No.: 4,229

[22] Filed: Jan. 12, 1993

Related U.S. Application Data

[63] Continuation of Ser. No. 710,140, Jun. 4, 1991, abandoned.

[51] Int. Cl.$^5$ ............................ G03G 5/16; G01J 5/04
[52] U.S. Cl. ................................... 250/583; 250/303; 250/381; 250/393; 250/494.1; 250/497.1; 250/506.1; 436/56; 436/57
[58] Field of Search .................. 250/302, 303, 327.2 B, 250/327.2 C, 344, 345, 381, 390.02, 393, 494.1, 497.1, 506.1; 436/56, 57, 172

[56] References Cited
U.S. PATENT DOCUMENTS

| | | | |
|---|---|---|---|
| 3,859,527 | 1/1975 | Luckey | 250/327 |
| 4,011,308 | 3/1977 | Giaever | 436/525 |
| 4,041,146 | 8/1977 | Giaever | 436/518 X |
| 4,405,720 | 9/1983 | Merrill | 436/86 |
| 4,734,581 | 3/1988 | Hashiue | 250/327.2 |
| 4,855,598 | 8/1989 | Ohgoda et al. | 250/327.2 B |

FOREIGN PATENT DOCUMENTS 62-93679 4/1987 Japan .

OTHER PUBLICATIONS

Brewer, S., Solving Problems in Analytical Chemistry, 1980, pp. 276-285.
E. H. McConkey, "Double-Label Autoradiograpy for Comparison of Complex Protein Mixtures after Gel Electrophoresis", Analytical Biochemistry 96, pp. 39-44 (1979).
K. H. Choo et al., "Double-Labeling and High Precision Comparison of Complex Protein Patterns on Two-Dimensional Polyacrylamide Gels", Analytical Biochemistry 103, pp. 33-38 (1980).
R. E. LeCocq et al., "The Use of L-[$^{35}$S] Methionine and L-[$^{75}$Se] Selenomethionine for Double-Label Autoradiography of Complex Protein Patterns on Two-Dimensional Polyacrylamide Gels: A Drastic Shortening of the Exposure Time", Analytical Biochemistry 127, pp. 293-299 (1982).
K. E. Walton et al., "Genetic Polymorphism in Normal Human Fibroblasts as Analyzed by Two-Dimensional Polyacrylamide Gel Electrophoresis", Journal of Biological Chemistry, vol. 254, No. 16, pp. 7951-7960, Aug. 25, 1979.

*Primary Examiner*—Lyle A. Alexander
*Assistant Examiner*—Milton I. Cano
*Attorney, Agent, or Firm*—Schneck & McHugh

[57] ABSTRACT

Using storage phosphor recording media, two exposures are made of a sample containing two target substances tagged with different radiative emitters, for example 32-P and 35-S. The first exposure, image 1, is of the sample directly on the phosphor screen. The second exposure, image 2, is made with the appropriate absorption material between the sample and screen. Both images are captured. By using simultaneous equations isotope contributions of each label can be determined. Quantitative assessment of the contributions of the isotopes, and hence the target substances, are made by calculating isotope efficiencies both with and without the absorption filter.

10 Claims, 6 Drawing Sheets

DUAL ENERGY TRACER QUANTITATIVE ANALYSIS

This is a continuation of application Ser. No. 07/710,140, filed Jun. 4, 1991, now abandoned.

BACKGROUND OF THE INVENTION

Radioisotopes are fundamental tools in experimental biology. Their use has permitted the development of powerful approaches to the study of metabolic transformation and regulation. One such approach is dual radioisotope labeling in which different molecular events are tracked simultaneously by separate isotopes. Using channel discrimination on a scintillation counter, one can attain quantitative accuracy for two isotopes over a wide range of isotopic ratios. However, scintillation counting analyzes one sample at a time and is therefore difficult to combine with powerful spatial separation techniques such as gel electrophoresis.

Several investigators have attempted to apply dual tracer methods, particularly double radioisotope analysis to two-dimensional autoradiograms using X-ray film as the recording medium (McConkey, Choo, Lecocq, Walton). Unfortunately, accurate quantitation of X-ray film autoradiograms is difficult to achieve since X-ray film has a limited dynamic range (about 200:1), is relatively insensitive to beta-radiation, and exhibits a nonlinear response. For these reasons, dual label methods are not widely used with X-ray film images.

U.S. Pat. No. 4,734,581 to M. Hashive describes an autoradiographic process for obtaining information on two dimensional locations of radioactively labeled substances. Japanese Pat. No. 62-93679 to H. Shiraishi describes a double-sided storage phosphor imaging plate that can be used for dual label autoradiographic imaging.

An object of the invention was to devise an improved dual label method for two-dimensional quantitative analysis that uses standard storage phosphor screens.

SUMMARY OF THE INVENTION

The above object has been achieved using radiation sensitive recording screens for constructing two, two-dimensional images of a sample having two target substances tagged with radiative emitters of different energy or intensity. One emitter is selected to have radiation more readily filtered than the other, so that the intensity contribution of a first substance can be isolated. By "filtered" is meant not only blocking of radiation, but also attenuation of radiation to a substantial degree so that a signal representing the unfiltered tracer is substantially stronger than one from the filtered tracer. The intensity or energy contribution of the substance tagged with the filtered tracer is then inferred and the amount of each tagged substance is known in a two-dimensional image.

Storage phosphor imaging screens or plates consist of a thin two-dimensional layer of a suitable phosphor in a compatible binder forming a screen or plate. Phosphor imaging materials are described in the previously mentioned U.S. Pat. No. 4,734,581. The screens or plates are exposed to stable, long lived radiative emitters, for example to radioactive tagged target substances in the form of a dried gel, blot or the like in the same manner that film is exposed. The phosphor material stores the energy of the incident radiation as a latent image which can be released upon controlled scanning with a He-Ne laser. The dynamic range of this system is five orders of magnitude, with sensitivity to beta emissions of 10 to 250 times that of X-ray film.

Using a two-dimensional barrier filter, one can take advantage of differential decay energies of the tracer isotopes to discriminate between them. Filters must be selected which will strongly attenuate low energy emissions, without appreciable attenuation of high energy emissions. A first substance is tagged with a low energy radioactive emitter, while a second target substance is tagged with a high energy emitter. The target substances may be within a common blot, such as an electrophoresis pattern where resolution of the two substances is not possible. The storage phosphor is exposed to the radiation, for example by placing a sheet of the storage phosphor material in contact with the substrate supporting the sample containing the target substances as shown in U.S. Pat. No. 4,734,581. A latent image is created in the storage phosphor which is then developed yielding a first image pattern. The process is repeated, except this time using a filter which preferentially attenuates the low energy tracer, leaving an image of the sample with primarily the target substance tagged with the high energy tracer showing, in a second image pattern. Using known amounts of each radioactive tracer, the efficiency of image formation is determined for each tracer on both direct and filtered images. Using these efficiencies, the contribution of each tracer can be quantitatively determined at any location of the sample, as described below.

BEST MODE FOR CARRYING OUT THE INVENTION

In order to determine detector efficiency, radioactive standards are prepared consisting of a dilution series of known amounts of $^{35}$S-sulfate or $^{32}$P-orthophosphate (Amersham; Arlington Heights, Ill.) spotted onto 5/16 inch adhesive paper disks (Avery; Azusa, Calif.). The standards should cover five full orders of magnitude for each isotope in order to measure accurately the differential efficiency of energy transfer for each isotope across the filter. To promote uniform absorption of the radioactive solutions, the disks are soaked with mild detergent solution and dried prior to sample application. Disks are spotted with 4 $\mu$l of each sample, then allowed to air dry. Double-labeled samples are prepared in a similar manner consisting of a series of mixtures of $^{32}$P-orthophosphate and $^{35}$S-sulfate. The ratios of $^{32}$P to $^{35}$S in these samples may range from $2\times10^{-7}$ to $8\times10^3$.

The labeled disks are affixed to a sheet of filter paper to facilitate handling. Other radioactive labels containing $^3H$, $^{14}C$ and $^{125}I$ could also be used.

Figure 1:
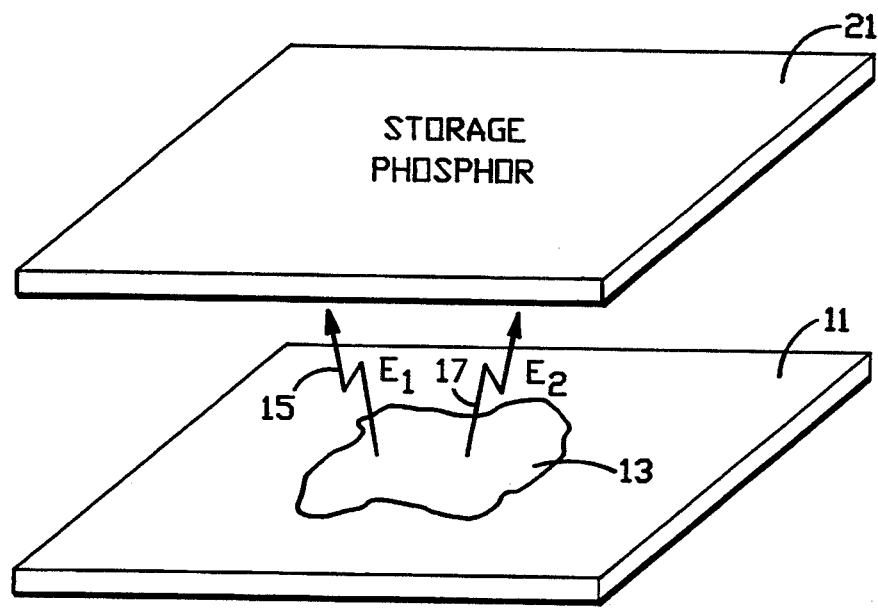
FIG. 1 is an exploded perspective view of a substrate containing a sample disposed below a storage phosphor material.

The standards and the double-labeled samples are exposed to a storage phosphor screen, preferably $BaFBr:Eu^{+2}$ for 45 minutes at room temperature as shown in FIG. 1, except that substrate 11 is in contact with storage phosphor screen 21. Double-labeled samples are those having two unknown or target substances, each tagged with a different tracer or label, with different energies.

With reference to FIG. 1, the substrate 11 is shown to have a double label sample 13. In this case, the sample has a first label or tracer emitting radiation of energy E1, indicated by line 15 and a second label or tracer emitting energy E2, indicated by line 17. The storage phosphor recording sheet 21 is placed in direct contact with substrate 11. However, for purposes of illustration, the two are shown spaced apart. Once the exposure is complete, a latent image is stored on the storage phosphor 21.

Figure 2:
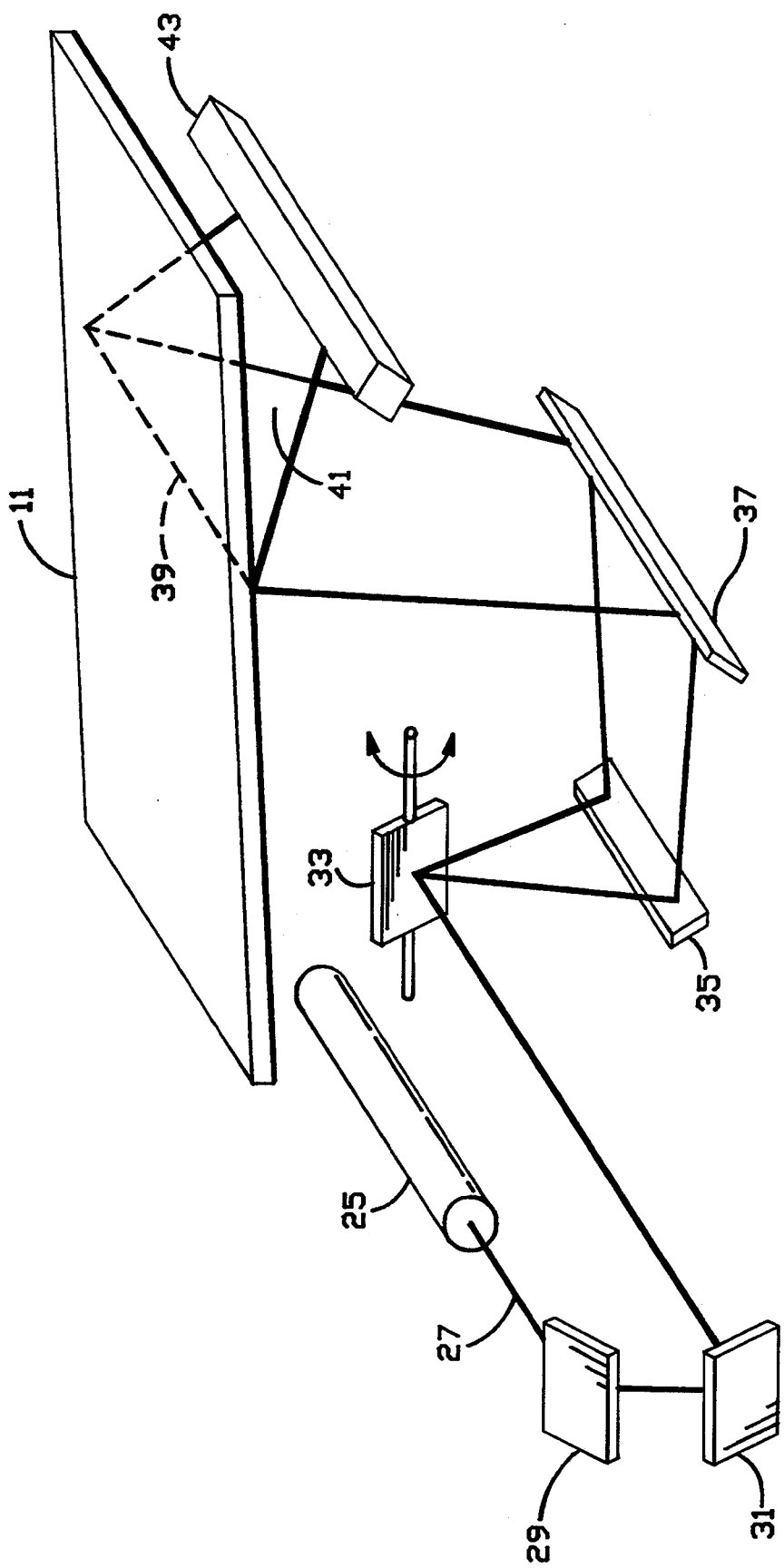
FIG. 2 is a perspective plan view of apparatus for developing and reading a storage phosphor material.

The storage phosphor is read by a scanner, as shown in FIG. 2. The storage phosphor 11 is face down relative to the optics shown immediately below a storage phosphor. A scanning beam is generated by a laser in the following manner. Laser 25 generates beam 27 which is directed to turning mirrors 29 and 31 toward the galvanometer mirror 33. The galvanometer mirror can accomplish scanning of the storage phosphor. A pivot axis is perpendicular to the optical axis and includes a spindle supporting the galvanometer mirror. The storage phosphor 11 may be moved on a carriage in a direction perpendicular to the direction of the scan so that areawise scanning of the phosphor sheet is performed. An optical f-theta correcting lens may be provided in the reflected beam path to correct for tangential spacing errors in the image plane. Laser quality mirrors 35 and 37 direct the scanning beam toward the storage phosphor 11 where it is incident along a line 39. Preferably, laser 25 is a helium-neon laser with a red beam. Light which is emitted by the storage phosphor is blue light, indicated by scattering pattern 41. Light emitted by the storage phosphor is collected by a fiber-optic bundle and passed to a photomultiplier tube, both forming optical detector 43. Since the position of the galvanometer mirror 33 may be carefully controlled, the beam position is accurately known. Hence, emitted light may be associated with a pixel on the storage phosphor. This allows a digital image of the storage phosphor to be formed by detector 43. The digital image is a first image pattern and includes radiative emissions from the two tracers associated with the sample. A storage phosphor reader of the type described is the Molecular Dynamics 400E Phosphor Imager. General methods for reading phosphor images are described in U.S. Pat. No. 3,859,527 to Luckey, U.S. Pat. No. 4,258,264 to N. Kotera et al. and U.S. Pat. No. 4,777,597 to Shiraishi et al.

Immediately after scanning, the scanned image is digitally stored and the screen is erased or a new screen is used. Next the samples are exposed for an identical period of time with a 36 μm (0.0014 inch) copper foil filter (Frontier PC Suppliers, Placentia, Calif.) between the sample and the screen as shown in FIG. 3.

Figure 3:
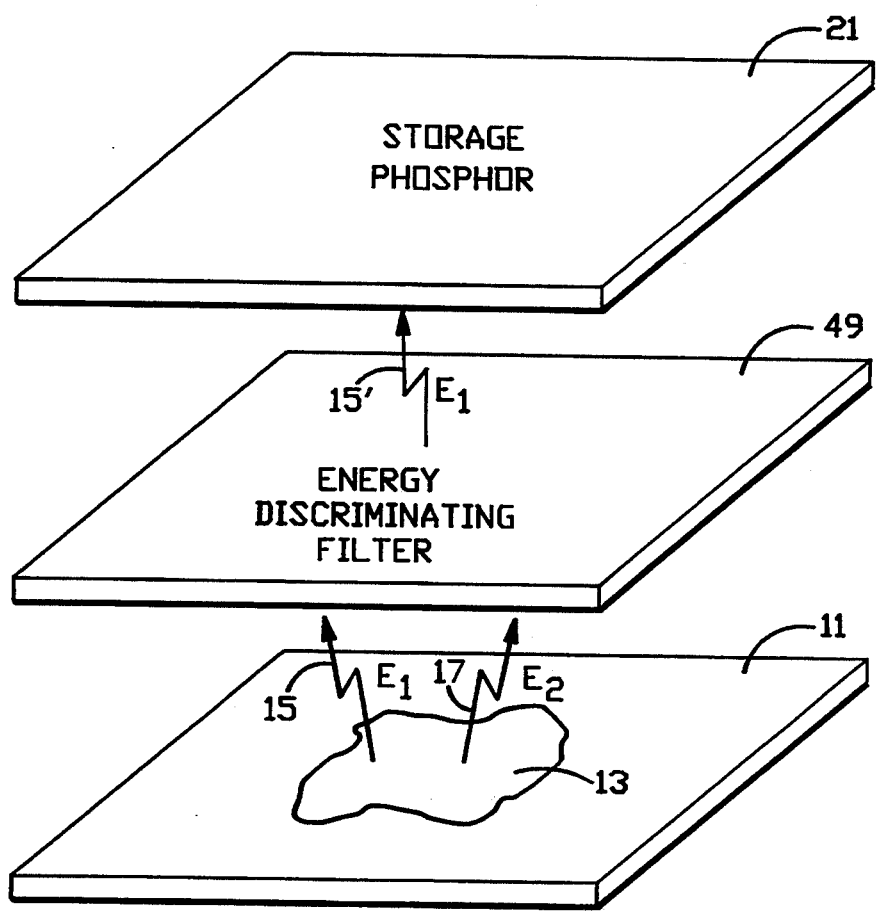
FIG. 3 is an exploded perspective view of a substrate having a sample disposed below a storage phosphor material with an energy discriminating filter therebetween.

With reference to FIG. 3, the substrate 11 has a double labeled sample 13, just as in FIG. 1. The sample includes a first label or tracer emitting radiation of energy E1, indicated by line 15 and a second label or tracer emitting energy E2, indicated by line 17. An energy discriminating filter 49 is interposed between substrate 11 and storage phosphor 21. The filter has the effect of attenuating most of the energy E2, while allowing passage of a substantial amount of energy E1, indicated by line 15'. In the case of copper foil having a thickness of 36 μm (1.4 mils), the amount of attenuation of $^{35}S$ signals is on the order of 99.88% while attenuating $^{32}P$ by only 31%. A mylar film having a thickness of 76 μm (3 mils) will attenuate $^{35}S$ signals by approximately 67%, while attenuating $^{32}P$ signals by only 2%. The table below shows the attenuation of $^{32}P$ and $^{35}S$ signals by various materials expressed as a percentage of the unfiltered signal. The labeled standards were exposed to the storage phosphor screen for one hour, with the screen partially covered with a piece of the filter material.

| % Attenuation of $^{32}P$ and $^{35}S$ Signals by Various Materials | | |
|---|---|---|
| | $^{32}P$ | $^{35}S$ |
| 36 μm (0.0014") copper foil | 31 | 99.88 |
| 71 μm (0.0028") copper foil | 47 | 99.99 |
| 13 μm (0.0005") aluminum foil | 0 | 0 |
| Parafilm | 0 | 73 |
| Whatman 1 filter paper | 0 | 89 |
| Saran Wrap | 3 | 42 |
| waxed paper | 0 | 57 |
| 13 μm (0.0005") mylar | 3 | 38 |
| 76 μm (0.003") mylar | 2 | 67 |

The imaging technique described above has a dynamic range of more than five orders of magnitude and, for most purposes, is adequately linear over the entire range. However, the accuracy of double label calculations depends on a constant detection efficiency over the entire dynamic range of the instrument.

Figure 5A:
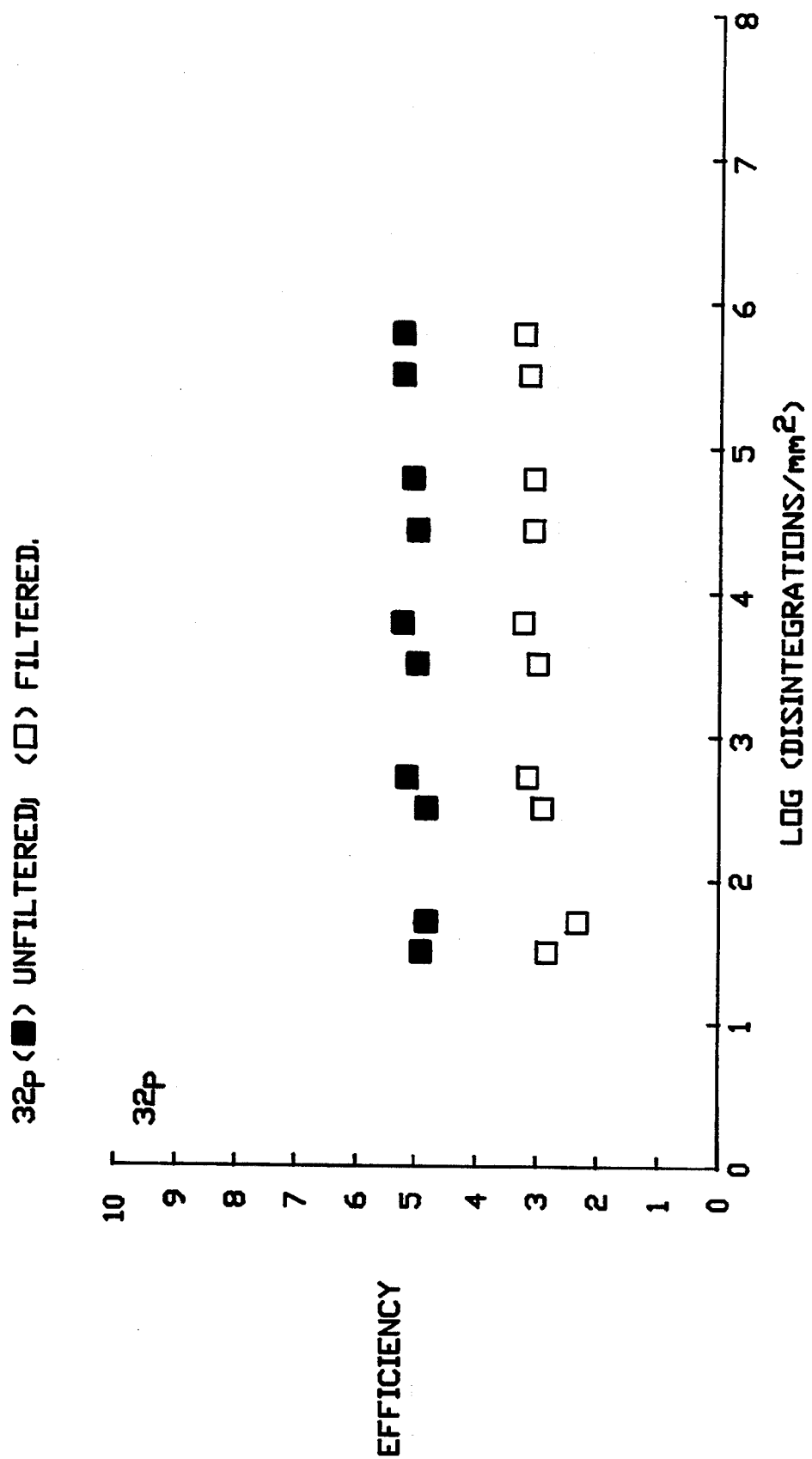
FIGS. 5a and 5b are plots of calculated efficiencies for standard spots under both direct and filtered exposure conditions.
Figure 5B:
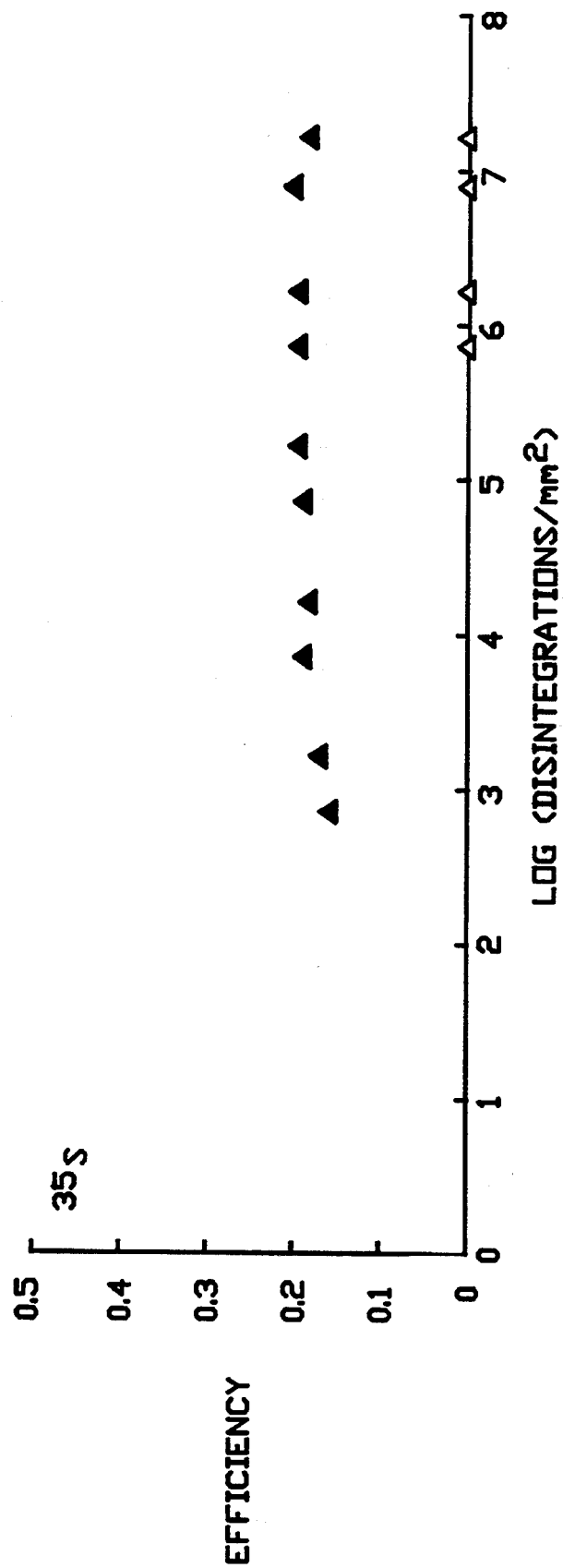

An efficiency curve may be devised by exposing five-order $^{32}P$ standards, prepared as described above, to a storage phosphor screen for 45 minutes. Efficiency is defined as the integrated signal from each spot using a reader apparatus similar to the device of FIG. 2 divided by the known total disintegrations. Total disintegrations were determined by counting each spot on a Beckman LS-250 liquid scintillation counter. The efficiency changed gradually over the large dynamic range of the instrument; however, for a given integrated output signal the slope of the efficiency curve was the same for both isotopes and the data could be corrected to give constant efficiency for both isotopes, as shown in FIGS. 5A and 5B.

Figure 4:
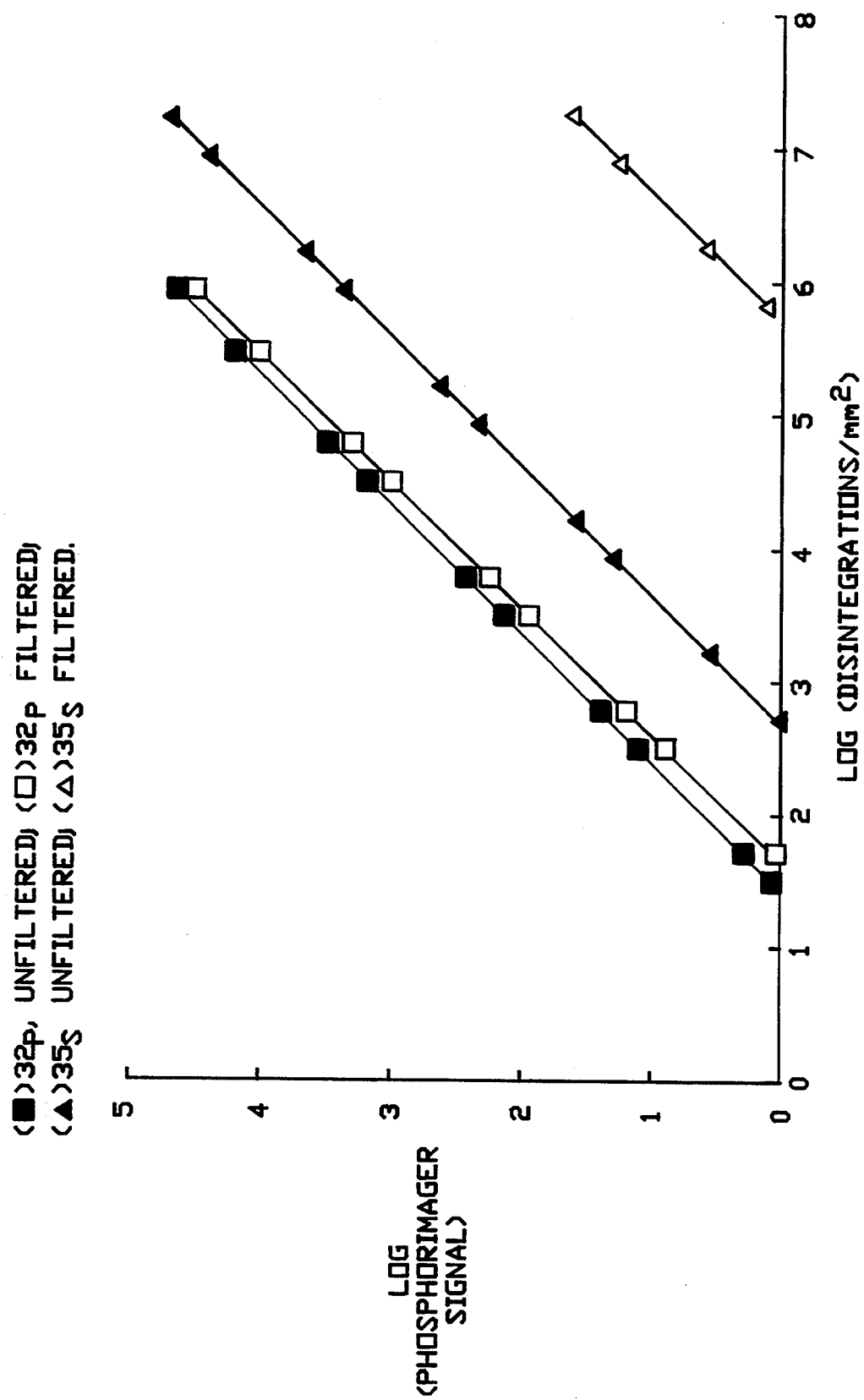
FIG. 4 is a plot of imager signal versus disintegrations per unit area.

In FIG. 4, the differential attenuation of $^{32}P$ and $^{35}S$ by copper foil is plotted with the log of the imager signal being shown along the y-axis and the log of total disintegrations per square millimeter shown along the x-axis. The plot of FIG. 4 was made using $^{32}P$ and $^{35}S$ standards exposed to the storage phosphor screen for 45 minutes with and without a copper foil filter having a thickness of 1.4 mils. The efficiency curve for the unfiltered $^{32}P$ standards defines this correction. Points on the curve were each multiplied by a factor such that the efficiencies for the products (i.e. corrected signal values) would be constant. The corrected signal values define a conversion curve which was used to apply the correction to the image files of both unfiltered and filtered exposures. This correction produced flat efficiency curves for both isotopes under both filtered and unfiltered conditions as shown in FIGS. 5A and 5B.

Quantitation of two isotopes (e.g. $^{32}P$ and $^{35}S$) in the same sample is performed as follows:

The sample (dried gel, blot, etc.) is exposed twice, first directly, and then with the copper filter between the sample and the storage phosphor screen. A set of standards for each isotope, as described above, is exposed with the sample. The standards are analyzed to calculate efficiencies (E) for each isotope under both exposure conditions:

$$E = \frac{\text{instrument counts/mm}^2}{\text{total disintegrations/mm}^2} \qquad (\text{Eq. 1})$$

The two exposures of the standards yield four efficiencies:

$E_{1P}$=Efficiency for $^{32}P$ in direct exposure
$E_{2P}$=Efficiency for $^{32}P$ in filtered exposure
$E_{1S}$=Efficiency for $^{35}S$ in direct exposure
$E_{2S}$=Efficiency for $^{35}S$ in filtered exposure The two images of the sample are analyzed to determine the integrated PhosphorImager counts (C) for all spots of interest. For each spot, the values for the two exposures are:

$C_1$=counts/spot, direct exposure
$C_2$=counts/spot, filtered exposure.

We wish to determine the total disintegrations that occurred in each spot during the time of the exposure. If we define $D_P$ and $D_S$ as the total disintegrations/spot from $^{32}P$ and $^{35}S$ respectively, then:

$$C_1 = E_{1P}D_P + E_{1S}D_S \qquad (\text{Eq. 2})$$

$$C_2 = E_{2P}D_P + E_{2S}D_S \qquad (\text{Eq. 3})$$

Solving these simultaneous equations for $D_P$ and $D_S$ we obtain:

$$D_P = \frac{E_{1S}C_2 - E_{2S}C_1}{E_{1S}E_{2P} - E_{1P}E_{2S}} \qquad (\text{Eq. 4})$$

$$D_S = \frac{E_{2P}C_1 - E_{1P}C_2}{E_{1S}E_{2P} - E_{1P}E_{2S}} \qquad (\text{Eq. 5})$$

Figure 6:
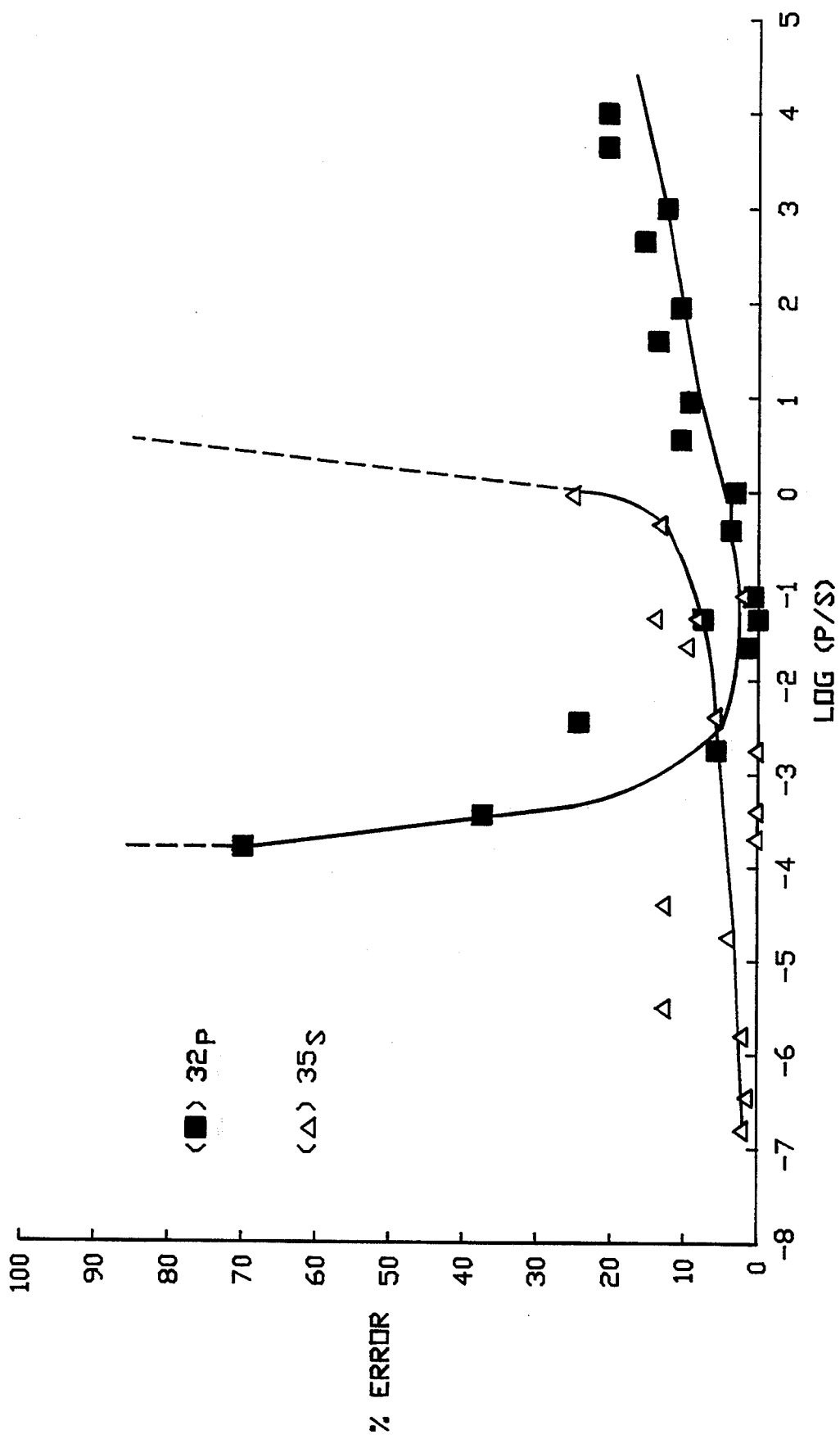
FIG. 6 is a plot showing a comparison of known and calculated disintegrations per unit time for two radioactive isotopic tracers in double labeled samples.

The results are in total disintegrations/spot during the exposure. FIG. 6 is a comparison of known and calculated disintegrations per minute for dual tracers in a double label sample. The amounts of two isotopes are determined using equations 4 and 5 and compared to known activity. Percent error is shown so that quantitative assessments of target substances can be made.

In the ideal case, the filter would block $^{35}S$ completely without affecting $^{32}P$. That is, $E_{2S} < E_{1S}$, and $E_{2P} = E_{1P}$. Equation 4 would reduce to:

$$D_P = C_2/E_{2P} \qquad (\text{Eq. 6})$$

and only spots or bands containing $^{32}P$ would be visible on the filtered exposure. In practice, $$E_{1S}E_{2P} \approx 550 E_{1P}E_{2S},$$

so that one would expect some contribution of $^{35}S$ on the filtered image from a sample containing a large dynamic range of $^{35}S$, such as a two-dimensional protein gel. However, for some sample types, such as DNA sequencing gels, it is possible to limit the dynamic range of the isotopes and produce a filtered image which shows only $^{32}P$. In this case, the contribution of $^{35}S$, the weaker emitter, in reference to a composite image is known by subtraction, forming a third image.

Although the equations shown here refer to $^{32}P$ and $^{35}S$, the method applies to any two isotopes or radiative emitters, such as X-ray emitters, whose emission energies differ enough that they can be adequately resolved by a suitable filter.

We claim:

1. A method for quantitative analysis of two target substances existing on a substrate comprising:

tagging first and second target substances on a substrate with primary and secondary labels, respectively, the primary label having a more energetic radiation emission characteristic than the secondary label, radiation emitted by the labels having the property of activating storage phosphor material, providing the substrate with a set of standards for each label, exposing a first radiation storage phosphor material to said substrate containing said tagged target substances and said standards, thereby creating a latent image on said first radiation storage phosphor material, exposing a second radiation storage phosphor material to said substrate through a radiation emission attenuating membrane, said membrane attenuating substantially more of the less energetic radiation from the target substance tagged with the secondary label than the more energetic radiation from the target substance tagged with the primary label, thereby creating a second latent image on said second radiation storage phosphor material with a relatively larger intensity contribution from the primary label than that from the secondary label as compared to corresponding contributions to the latent image on the first radiation storage phosphor material, developing the latent images to produce first and second image patterns, constructing an image intensity curve from each of said image patterns such that exposure efficiencies of said labels are substantially constants in said curves, calculating the exposure efficiency, E, for each label under both exposuring steps from portions of said image intensity curves corresponding to said set of standards for each label and from an independent measurement of radiation emitted from each standard on said substrate, yielding four efficiencies, $E_{1P}$, $E_{2P}$, $E_{1S}$, $E_{2S}$ where $E_{1P}$=Efficiency for primary label in first radiation storage phosphor material exposing step $E_{2P}$=Efficiency for primary label in second radiation storage phosphor material exposing step $E_{1S}$=Efficiency for secondary label in first radiation storage phosphor material exposing step $E_{2S}$=Efficiency for secondary label in second radiation storage phosphor material exposing step, measuring integrated image intensity per spot area on each image intensity curve as concentrations $C_1$ and $C_2$, and solving the two equations for $D_P$ and $D_S$ $$C_1 = E_{1P}D_P + E_{1S}D_S$$

$$C_2 = E_{2P}D_P + E_{2S}D_S$$

where $D_P$ and $D_S$ is the total radiation per label at said spot area, the total radiation per label indicating the amount of each of the two tagged target substances on the substrate.

2. The method of claim 1 further defined by scanning the developed latent images to produce a pixel representation of the images, each pixel represented by an electrical signal.

3. The method of claim 2 wherein said membrane is selected from the group consisting of copper foil, paper and mylar.

4. The method of claim 1 wherein said first radiation storage medium is a storage phosphor screen.

5. The method of claim 1 wherein said second radiation storage medium is a storage phosphor screen.

6. The method of claim 1 further comprising exposing said first and second radiation storage mediums to said substrate in a manner which creates a latent image on each of said storage mediums containing contributions from both said primary and said secondary labels.

7. A method for quantitative analysis of plural target substances existing on a substrate comprising, tagging first and second target substances on a substrate with first and second radioactive labels, while also tagging a series of standards on the substrate with the same labels, the first label having a more energetic radiation emission characteristic than the second label, radiation emitted by the labels having the property of activating storage phosphor material, exposing a first storage phosphor screen to said substrate, thereby creating a first latent image on the first storage phosphor screen, exposing a second storage phosphor screen to said substrate through a radiation emission attenuating membrane, said membrane attenuating substantially more of the less energetic radiation from the target substance tagged with the second label than the more energetic radiation from the target substance tagged with the first label, thereby creating a second latent image on the second storage phosphor screen with a relatively larger intensity contribution from the first label than the that from the second label as compared to corresponding contributions to the latent image on the first storage phosphor screen, developing the latent images by scanning the storage phosphor screens, producing signal representations of the developed images wherein exposure efficiencies of said labels are substantially constants in the image representations, calculating the exposure efficiency for each label in each of said exposures from those portions of the image representations corresponding to said set of standards for each label and from an independent measurement of radiation emitted from each standard on said substrate, measuring integrated image intensity per spot area on each image representation, simultaneously determining the amount of each target substance in the spot area using the image intensities and exposure efficiencies.

8. The method of claim 7 wherein said radioactive labels are selected from the group consisting of $^3H$, $^{14}C$, $^{35}S$, $^{32}P$ and $^{125}I$.

9. The method of claim 7 wherein said membrane is selected from the group consisting of copper foil, paper and mylar.

10. A method for quantitative analysis of two target substances existing on a substrate comprising:

tagging first and second target substances on a substrate with primary and secondary labels, respectively, the primary label having a more energetic radiation emission characteristic than the secondary label, radiation emitted by the labels having the property of activating storage phosphor material, providing the substrate with a set of standards for each label, exposing a radiation storage phosphor material to said substrate containing said tagged target substances and said standards, thereby creating a first latent image on said radiation storage phosphor material, developing said first latent image to produce a first image pattern, storing said first image pattern in a storage phosphor material, erasing said first latent image from said radiation storage phosphor material, exposing said radiation storage phosphor material to said substrate through a radiation emission attenuating membrane, said membrane attenuating substantially more of the less energetic radiation from the target substance tagged with the secondary label than the more energetic radiation from the target substance tagged with the primary label, thereby creating a second latent image on said radiation storage phosphor material with a relatively larger intensity contribution from the primary label than that from the secondary label as compared to corresponding contributions to the first latent image, developing said second latent image to produce a second image pattern, storing said second image pattern in said storage phosphor material, constructing an image intensity curve from each of said stored image patterns, such that exposure efficiencies of said labels are substantially constants in said curves, calculating the exposure efficiency, E, for each label under both exposuring steps from those portions of said image intensity curves corresponding to said set of standards for each label and from an independent measurement of radiation emitted from each standard on said substrate, yielding four efficiencies, $E_{1P}$, $E_{2P}$, $E_{1S}$, $E_{2S}$ where $E_{1P}$=Efficiency for primary label in first radiation storage phosphor material exposing step $E_{2P}$=Efficiency for primary label in second radiation storage phosphor material exposing step $E_{1S}$=Efficiency for secondary label in first radiation storage phosphor material exposing step $E_{2S}$=Efficiency for secondary label in second radiation storage phosphor material exposing step;

measuring image intensity per spot area on each image intensity curve as concentrations $C_1$ and $C_2$; and solving the two equations for $D_P$ and $D_S$ $$C_1 = E_{1P}D_P + E_{1S}D_S$$

$$C_2 = E_{2P}D_P + E_{2S}D_S$$

where $D_P$ and $D_S$ is the total radiation per label at said spot area, the total radiation per label indicating the amount of each of the two tagged target substances on the substrate.

* * * * *